United States Patent [19]

Horsey et al.

[11] Patent Number: 5,240,976
[45] Date of Patent: Aug. 31, 1993

[54] N,N'-ALKENYLENE AMINE/MERCAPTOTOLYLIMIDAZOLE BLENDS AS HIGH TEMPERATURE ANTIOXIDANTS FOR ELASTOMERS

[75] Inventors: Douglas W. Horsey, Briarcliff Manor; Ambelal R. Patel, Scarsdale, both of N.Y.

[73] Assignee: Ciba-Geigy Corporation, Ardsley, N.Y.

[21] Appl. No.: 934,092

[22] Filed: Aug. 21, 1992

[51] Int. Cl.$^5$ ............................................. C08K 5/3465
[52] U.S. Cl. ....................................... 524/93; 524/167; 524/172; 524/217; 524/239; 524/248; 524/251; 524/252; 524/254; 524/255; 524/257; 524/258
[58] Field of Search ................. 524/93, 167, 170, 172, 524/241, 239, 217, 243, 252, 254, 257, 255, 258

[56] References Cited

U.S. PATENT DOCUMENTS

| | | | |
|---|---|---|---|
| 2,136,177 | 11/1938 | Carothers et al. | 524/257 |
| 2,415,020 | 1/1947 | Morey | 564/509 |
| 2,440,724 | 5/1949 | Morey | 564/509 |
| 2,565,488 | 8/1951 | Finch et al. | 564/509 |
| 2,565,529 | 8/1951 | Smith | 564/509 |
| 2,923,752 | 2/1960 | Leyland et al. | 524/93 |
| 2,923,753 | 2/1960 | Leyland et al. | 524/93 |
| 3,773,833 | 11/1973 | Henrici et al. | 564/509 |
| 4,082,706 | 4/1978 | Danielson | 564/509 |
| 5,151,459 | 9/1992 | Babiarz et al. | 524/258 |

FOREIGN PATENT DOCUMENTS

| | | |
|---|---|---|
| 1470874 | 1/1969 | Fed. Rep. of Germany . |
| 48-1426 | 1/1973 | Japan . |
| 54-107943 | 8/1979 | Japan . |
| 55-108429 | 8/1980 | Japan . |
| 55-110135 | 8/1980 | Japan . |
| 56-116739 | 9/1981 | Japan . |
| 58-183740 | 10/1983 | Japan . |
| 62-141044 | 6/1987 | Japan . |
| 63-120752 | 5/1988 | Japan . |
| 63-260112 | 10/1988 | Japan . |
| 448200 | 6/1974 | U.S.S.R. . |

Primary Examiner—Veronica P. Hoke
Attorney, Agent, or Firm—Luther A. R. Hall

[57] ABSTRACT

Elastomers are very effectively stabilized against thermal and oxidative degradation at elevated temperatures with a blend of an N,N,N',N'-tetrasubstituted 1,4-diamino-2-butene, where the substituents are alkyl, cycloalkyl, aralkyl, aryl or mixtures thereof, in combination with a mercaptoimidazole of formula IV

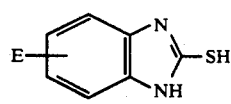

(IV)

where E is hydrogen, alkyl, cycloalkyl, aryl or phenylalkyl.

13 Claims, No Drawings

N,N'-ALKENYLENE AMINE/MERCAPTOTOLYLIMIDAZOLE BLENDS AS HIGH TEMPERATURE ANTIOXIDANTS FOR ELASTOMERS

Elastomers are very effectively stabilized against thermal and oxidative degradation at elevated temperatures by a blend of an N,N,N',N'-tetrasubstituted 1,4-diamino-2-butene and a mercaptoimidazole.

BACKGROUND OF THE INVENTION

There is an ever-increasing demand for elastomers that are thermally stable at higher and higher temperatures as the automotive under-hood temperatures and wire and cable requirements increase dramatically. The search for new antioxidants is thus a compelling one to meet such needs.

Diphenylamine and diarylamine derivatives, hydroquinolines and certain mixtures of diphenylamine and mercaptotolylimidazole are considered the state of the art high temperature antioxidants for elastomers. Although such antioxidants have hitherto been the standards in the art, there has been a long felt need for still better high temperature antioxidants for elastomers especially as use temperatures continue to increase.

The instant substituted 1,4-diamino-2-butene compounds fall into three general groups depending on the various substituents on the two N-atoms.

When said substituents are alkyl, compounds having at least one lower alkyl, preferably two lower alkyl groups, on each N-atom are known. Lower alkyl includes methyl, ethyl, propyl butyl and amyl. Typical is N,N,N',N'-tetramethyl-2-butene-1,4-diamine. The use of such lower alkyl compounds as stabilizers is not disclosed. The instant alkyl substituents are higher alkali such as octyl, decyl, octadecyl and the like.

When said substituents are aralkyl, the hydrochloride salt of such the tetrabenzyl compound has a CAS number (5443-70-9), but no other published reference is known for said material nor is there any known utility for said compound. The other tetra-aralkyl compounds are believed to be novel materials. The stabilized compositions where the stabilizers are the instant compounds having one or more aralkyl substituents are not disclosed in the prior art.

When said substituents are aryl, British Patent No. 1,438,482 generically describes lubricant compositions containing substituted aryl amines of the formula R—X where R is a secondary amine residue containing two aromatic groups attached to nitrogen such as (Ar)₂N—. This reference also generically describes compounds of the formula R—Y—R where Y is inter alia —CH₂CH=CHCH₂—. The only such compounds specifically disclosed by the British reference are those where R is an alkylated phenothiazine moiety. The closest compound of this reference is 1,4-but-2-ene-bis(3,7-dioctylphenothiazine).

British Patent No. 1,438,482 does not disclose or suggest that the compounds described therein can provide effective antioxidant protection to synthetic polymer compositions.

OBJECTS OF THE INVENTION

One object of this invention is to provide a superior antioxidant blend for the stabilization of elastomers at elevated temperatures.

Another object of this invention is a method of stabilizing elastomer against thermal and oxidative degradation at elevated temperatures by incorporating therein a blend of selected alkenylene diamines and selected mercaptoimidazoles.

DETAILED DISCLOSURE

The instant invention pertains to an elastomer composition stabilized against the deleterious effects of heat or oxygen at elevated temperatures which comprises
(a) an elastomer, and
(b) an effective stabilizing amount of a blend of
  (i) an amine of formula I, II or III

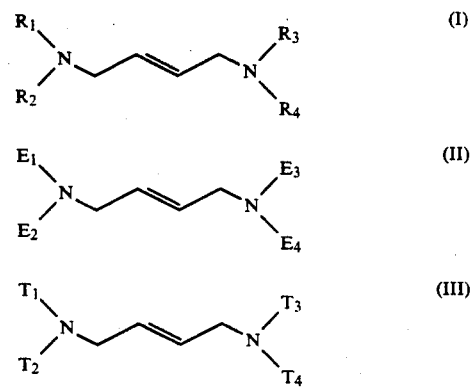

wherein
$R_1$, $R_2$, $R_3$ and $R_4$ are independently a linear or branched alkyl of 8 of 30 carbon atoms; alkyl of 1 to 20 carbon atoms substituted with cycloalkyl of 5 to 12 carbon atoms; or alkyl of 1 to 20 carbon atoms terminated with —$OR_5$, —$NR_6R_7$, —$SR_8$, —$COOR_9$ or —$CONR_{10}R_{11}$, where $R_5$, $R_6$, $R_7$, $R_8$ and $R_9$ are independently alkyl of 1 to 20 carbon atoms or alkenyl of 3 to 18 carbon atoms, and $R_{10}$ and $R_{11}$ are independently hydrogen or the same meaning as $R_5$; or alkyl of 3 to 18 carbon atoms interrupted by one or more —O—, —S—, —SO—, —SO₂—, —CO—, —COO—, —OCO—, —$CONR_{12}$—, —$NR_{12}CO$— or —$NR_{13}$— where $R_{12}$ and $R_{13}$ have the same meaning as $R_{10}$; or $R_1$, $R_2$, $R_3$ and $R_4$ are independently cycloalkyl of 5 to 12 carbon atoms; or alkenyl of 3 to 20 carbon atoms;

$E_1$ is aralkyl of 7 to 15 carbon atoms or said aralkyl substituted on the aryl ring by one to three groups selected from alkyl of 1 to 12 carbon atoms, —CN, —NO₂, halogen, —$OR_5$, —$NR_6R_7$, —$SR_8$, —$COOR_9$ or —$CONR_{10}R_{11}$, where $R_5$, $R_6$, $R_7$, $R_8$, $R_9$, $R_{10}$ and $R_{11}$ are as defined above, $E_2$, $E_3$ and $E_4$ are independently a linear or branched alkyl of 1 to 30 carbon atoms; alkyl of 1 to 20 carbon atoms substituted with cycloalkyl of 5 to 12 carbon atoms; or alkyl of 1 to 20 carbon atoms terminated with —CN, —$OR_5$, —$NR_6R_7$, —$SR_8$, —$COOR_9$ or —$CONR_{10}R_{11}$, where $R_5$, $R_6$, $R_7$, $R_8$ and $R_9$ are independently alkyl of 1 to 20 carbon atoms or alkenyl of 3 to 18 carbon atoms, and $R_{10}$ and $R_{11}$ are independently hydrogen or the same meaning as $R_5$; or alkyl of 3 to 18 carbon atoms interrupted by one or more —O—, —S—, —SO—, —SO₂—, —CO—, —COO—, —OCO—, —$CONR_{12}$—, —$NR_1$-

2CO— or —NR$_{13}$— where R$_{12}$ and R$_{13}$ have the same meaning as R$_{10}$; or E$_2$, E$_3$ and E$_4$ are independently cycloalkyl of 5 to 12 carbon atoms, alkenyl of 3 to 20 carbon atoms, aralkyl of 7 to 15 carbon atoms or said aralkyl substituted on the aryl ring by one to three groups selected from alkyl of 1 to 12 carbon atoms, —CN, —NO$_2$, halogen, —OR$_5$, —NR$_6$R$_7$, —SR$_8$, —COOR$_9$ or —CONR$_{10}$R$_{11}$, where R$_5$, R$_6$, R$_7$, R$_8$, R$_9$, R$_{10}$ and R$_{11}$ are as defined above, or aryl of 6 to 10 carbon atoms or said aryl substituted by one to three substituents selected from the group consisting of alkyl of 1 to 20 carbon atoms, cycloalkyl of 5 to 12 carbon atoms and aralkyl of 7 to 15 carbon atoms, and T$_1$, T$_2$, T$_3$ and T$_4$ are independently aryl of 5 to 10 carbon atoms or said aryl substituted by one to three substituents selected from the group consisting of alkyl of 1 to 20 carbon atoms, cycloalkyl of 5 to 12 carbon atoms and aralkyl of 7 to 15 carbon atoms, and (ii) a mercaptoimididazole of formula IV

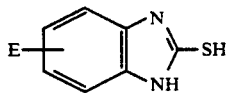

(IV)

where

E is hydrogen, alkyl of 1 to 18 carbon atoms, said alkyl substituted by —COOG where G is alkyl of 1 to 18 carbon atoms, cycloalkyl of 5 to 12 carbon atoms, aryl of 6 to 10 carbon atoms, or phenylalkyl of 7 to 9 carbon atoms;

where the weight ratio of component (i) to component (ii) in the blend is from 90:10 to 10:90.

Preferably R$_1$, R$_2$, R$_3$ and R$_4$ are independently cycloalkyl of 5 to 6 carbon atoms, a linear or branched alkyl of 8 to 20 carbon atoms or alkyl of 1 to 4 carbon atoms substituted with cycloalkyl of 5 to 6 carbon atoms.

Most preferably R$_1$, R$_2$, R$_3$ and R$_4$ are the same and are alkyl of 8 to 18 carbon atoms, cyclohexyl or cyclohexylmethyl.

Preferably E$_1$ is benzyl, benzyl substituted on the phenyl ring by alkyl of 1 to 18 carbon atoms, α-methylbenzyl or 1-naphthylmethyl.

Most preferably E$_1$ is benzyl or 1-naphthylmethyl.

Preferably E$_2$, E$_3$ and E$_4$ are independently alkyl of 1 to 20 carbon atoms, benzyl, benzyl substituted on the phenyl ring by alkyl of 1 to 8 carbon atoms or by methoxycarbonyl, phenyl, 1-naphthyl or said phenyl or said 1-naphthyl substituted by alkyl of 1 to 8 carbon atoms; cyclohexylmethyl or 2-cyanoethyl.

Most preferably E$_3$ has the same meaning as E$_1$ and is benzyl or 1-naphthylmethyl; and E$_2$ and E$_4$ are alkyl of 1 to 20 carbon atoms, benzyl or 1-naphthylmethyl.

Preferably T$_1$, T$_2$, T$_3$ and T$_4$ are independently phenyl, 1-naphthyl or said phenyl or said 1-naphthyl substituted by alkyl of 1 to 18 carbon atoms.

Most preferably T$_1$ and T$_3$ are phenyl and T$_2$ and T$_4$ phenyl or 1-naphthyl. Especially preferably, T$_1$, T$_2$, T$_3$ and T$_4$ are each phenyl.

Preferably E is hydrogen, alkyl of 1 to 4 carbon atoms, benzyl or alkyl substituted by —COOG where G is alkyl of 1 to 4 carbon atoms. Most preferably, E is methyl.

The compounds of formula I and formula II are conveniently prepared by reacting an appropriate secondary amine with 2-butene-1,4-diol diacetate in the presence of a catalyst such as tetrakis(triphenylphosphine)-palladium(0) in an organic solvent such as tetrahydrofuran.

The compounds of formula III are conveniently prepared by the reaction of the appropriate secondary diarylamine with 1,4-dibromobut-2-ene in the presence of an aqueous mixture of potassium iodide, a phase transfer catalyst and alkali.

The compounds of formula IV are largely items of commerce or can be prepared by known methods.

The starting materials for making the instant compounds are largely items of commerce.

When any of the aforementioned groups of R$_1$ to T$_4$, E or G are alkyl, they are, for example, methyl, ethyl, isopropyl, n-butyl, sec-butyl, tert-butyl, isoamyl, tert-amyl, n-hexyl, 2-ethylhexyl, isooctyl, n-octyl, tert-octyl, nonyl, decyl undecyl, lauryl, tridecyl, tetradecyl, hexadecyl, heptadecyl, octadecyl, eicosyl, tricontyl and branched isomers thereof.

Cycloalkyl of 5 to 12 carbon atoms includes, for example, cyclopentyl, cyclohexyl, cycloheptyl, cyclooctyl and cyclododecyl.

Phenylalkyl of 7 to 9 carbon atoms includes, for example, benzyl, phenethyl, α-methylbenzyl and α,α-dimethylbenzyl.

Aryl of 6 to 10 carbon atoms includes, for example, phenyl, 1-naphthyl and 2-naphthyl.

Aryl or phenylalkyl substituted by alkyl is, for example, tolyl, xylyl, ethylphenyl, 4-methylbenzyl, tert-butylphenyl, tert-octylphenyl, tert-dodecylphenyl, nonylnaphthyl or tert-octylnaphthyl.

The compositions of this invention have as component (a) an elastomer which is a thermoplastic or thermoset elastomer typically used in high temperature applications. Such elastomers include SBR rubber, EPDM, polybutadiene, nitrile rubber (NBR), dynamically crosslinked polypropylene/nitrile rubber, polychloroprene, and the like.

The instant compounds are effective stabilizers for synthetic elastomers subject to the deleterious effects of heat and/or oxygen especially during processing and use at elevated temperatures.

In general, the effective stabilizing amount of blends of component (b) of the present invention is from 0.1 to 10% by weight of the stabilized composition although this will vary with the particular substrate and application. An advantageous range is from 0.5 to 5% by weight and especially from 1 to 5% by weight.

The weight ratio of component (i) to (ii) in said blend is preferably 70:30 to 30:70; most preferably 50:50.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants 1.1. Alkylated monophenols, for example, 2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-i-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol, 1.2. Alkylated hydroquinones, for example,
2,6-di-tert-butyl-4-methoxyphenol
2,5-di-tert-butyl-hydroquinone
2,5-di-tert-amyl-hydroquinone
2,6-diphenyl-4-octadecyloxyphenol, 1.3. Hydroxylated thiodiphenyl ethers, for example,
2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol), 1.4. Alkylidene-bisphenols, for example,
2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl] terephthalate.

1.5. Benzyl compounds, for example,
1,3,5-tri(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt, 1.6. Acylaminophenols, for example,
4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate, 1.7. Esters of β-(3,5-di-tert-butyl-4-hydroxyphenyl)-propionic acid with monohydric or polyhydric alcohols, for example,
methanol
octadecanol
1,6-hexanediol
neopentyl glycol
thiodiethylene glycol
diethylene glycol
triethylene glycol
pentaerythritol
tris-hydroxyethyl isocyanurate
di-hydroxyethyl oxalic acid diamide, 1.8. Esters of β-(5-tert-butyl-4-hydroxy-3-methylphenyl)-propionic acid with monohydric or polyhydric alcohols, for example,
methanol
octadecanol
1,6-hexanediol
neopentyl glycol
thiodiethylene glycol
diethylene glycol
triethylene glycol
pentaerythritol
tris-hydroxyethyl isocyanurate
di-hydroxyethyl oxalic acid diamide, 1.9. Amides of β-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine, 1.10 Diarylamines, for example, diphenylamine, N-phenyl-1-naphthylamine, N-(4-tert-octylphenyl)-1-naphthylamine, 4,4'-di-tert-octyl-diphenylamine, reaction product of N-phenylbenzylamine and 2,4,4-trimethylpentene, reaction product of diphenylamine and 2,4,4-trimethylpentene, reaction product of N-phenyl-1-naphthylamine and 2,4,4-trimethylpentene.

2. UV absorbers and light stabilizers 2.1. 2-(2'-Hydroxyphenyl)-benzotriazoles, for example, the 5'-methyl-, 3',5'-di-tert- butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl),3'-tert-butyl-5'-tert-butyl-5'-(2 -(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyl-dithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl) sebacate, bis-(1,2,2,6,6-pentamethylpiperidyl) sebacate, n-butyl-3,5di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-(3,3,5,5-tetramethyl-piperazinone), bis(1-octyloxy-2,2,6,6-tetramethylpiperidin-4-yl) sebacate.

2.7. Oxalic acid diamides, for example, 4,4'-dioctyloxy-oxanilide, 2,2'-di-octyloxy-5,5'-di-tert-butyl-oxanilide, N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4 -octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-ethoxy)-phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)-phenyl]-6-(4-bromophenyl)-s-triazine; 2,4-bis[2-hydroxy-4-(2-acetoxyethoxy)phenyl]-6 -(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis salicyloylhydrazine, N,N'-bis-(3,5-di-tert-butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecylpentaerythritol diphosphite, di-(2,4-di-tert-butylphenyl)pentaerythritol diphosphite, tristearylsorbitol triphosphite, tetrakis-(2,4-di-tert-butylphenyl)4,4'-diphenylylenediphosphonite.

5. Compounds which destroy peroxide, for example esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alphaheptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flameproofing agents, anti-static agents, blowing agents and thiosynergists such as dilauryl thiodipropionate or distearyl thiodipropionate.

The phenolic antioxidant of particular interest is selected from the group consisting of n-octadecyl 3,5-di-tert-butyl-4-hydroxyhydrocinnamate, neopentanetetrayl tetrakis (3,5-di-tert-butyl-4 -hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4 -hydroxyhydrocinnamate), 1,3,5-trimethyl-2,4,6-tris(3,5-di-tert-butyl-4-hydroxybenzyl)-benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl-)isocynurate, 1,1,3,-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5 -di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5 -di-tert-butyl-4-hydroxyhydrocinnamamide), calcium bis(ethyl 3,5-di-tert-butyl-4-hydroxybenzylphosphonate), ethylene bis

[3,3-di(3-tert-butyl-4-hydroxyphenyl)butyrate], octyl 3,5-di-tert-butyl-4-hydroxybenzylmercaptoacetate, bis(3,5-di-tert-butyl-4-hyroxyhydrocinnamoyl)hydrazide, N,N'-bis[2-(3,5-di-tert-butyl-4-hydroxyhydrocinnamoyloxy)-ethyl]-oxamide, and 2,4-bis(octylthiomethyl)-o-cresol.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-tri-methyl-2,4,6-tris(3,5-di-tert-butyl-4-hydroxybenzyl)benzene, 1,3,5-tris(3,5-di-tert-butyl-4 -hydroxybenzyl)isocyanurate, 2,6-di-tert-butyl-p-cresol, 2,2'-ethylidene-bis(4,6-di-tert-butylphenol) or 2,4-bis(octylthiomethyl)-o-cresol.

The hindered amine compound of particular interest is selected from the group consisting of bis(2,2,6,6-tetramethylpiperidin-4-yl) sebacate, bis(1,2,2,6,6-pentamethylpiperidin-4-yl) sebacate, di(1,2,2,6,6-pentamethylpiperidin-4-yl) (3,5-di-tert-butyl-4-hydroxybenzyl)-butylmalonate, 4-benzoyl-2,2,6,6-tetramethylpiperidine, 4-stearyloxy-2,2,6,6-tetramethylpiperidine, 3-n-octyl-7,7,9,9-tetramethyl-1,3,8-triaza-spiro[4.5]decane-2,4-dione, tris(2,2,6,6-tetramethylpiperidin-4-yl) nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylene-bis-(amino-2,2,6,6-tetramethylpiperidine) and 1,2-dibromoethane, tetrakis(2,2,6,6-tetramethylpiperidin-4-yl) 1,2,3,4-butanetetracarboxylate, tetrakis(1,2,2,6,6-pentamethylpiperidin-4-yl) 1,2,3,4-butanetetracarboxylate, polycondensation product of 2,4-dichloro-6-morpholino-s-triazine and 4,4'-hexamethylenebis(amino-2,2,6,6-tetramethylpiperidine), N,N',N'',N'''-tetrakis[(4,6-bis(butyl-2,2,6,6-tetramethyl-piperidin-4-yl)-amino-s-triazin-2-yl]-1,10-diamino-4,7-diazadecane, mixed [2,2,6,6-tetramethylpiperidin-4-yl/β,β,β',β'-tetramethyl-3,9-(2,4,8,10-tetraoxaspiro[5.5]-undecane) diethyl] 1,2,3,4-butanetetracarboxylate, mixed [1,2,2,6,6-pentamethylpiperidin-4yl/β,β,β',β'-tetramethyl-3,9-(2,4,8,10-tetraoxaspiro[5.5 -undecane)diethyl] 1,2,3,4-butanetetracarboxylate, octamethylene bis(2,2,6,6-tetramethyl-piperidin-4-carboxylate), 4,4'-ethylenebis(2,2,6,6-tetramethylpiperazin-3-one) and bis(1-octyloxy-2,2,6,6-tetramethylpiperidin-4-yl)sebacate.

A most preferred hindered amine compound is bis (2,2,6,6-tetramethylpiperidin-4-yl) sebacate, the polycondensation product of 1-(2-hydroxyethyl)-2,2,6,6-tetramethyl-4-hydroxypiperdine and succinic acid, the polycondensation product of 2,4-dichloro-6-tert-octylamino-s-triazine and 4,4'-hexamethylenebis(amino-2,2,6,6-tetramethylpiperidine), N,N',N'',N'''-tetrakis[(4,6-bis(butyl-(2,2,6,6-tetramethyl-piperidin-4-yl)amino)-s-triazine-2-yl]1,10-diamino-4,7-diazadecane or bis(1-octyloxy-2,2,6,6-tetramethylpiperidin-4-yl) sebacate.

The following examples are presented for the purpose of illustration only and are not to be construed to limit the nature or scope of the instant invention in any manner whatsoever.

EXAMPLE 1

N,N,N',N'-Tetradecyl-2-butene-1,4-diamine

A solution of di-n-decylamine (10.9 g, 36.6 mmol) and 2-butene-1,4-diol diacetate (3.15 g, 18.3 mmol) in tetrahydrofuran (THF) (150 ml) is treated with tetrakis(triphenylphosphine)palladium (0) (1.0 g, 0.9 mmol) and stirred at room temperature overnight. The reaction mixture is concentrated in vacuo to a oil that is redissolved in THF (500 ml) and treated with 20% aqueous sodium hydroxide (250 ml). The mixture is stirred for one hour, concentrated, and extracted with ether. The ether extracts are dried and concentrated giving an orange oil which is purified by medium pressure chromatography (silica gel; 25% ethyl acetate in hexanes). The title compound is isolated as 5.8 g (49% yield) of a clear oil.

Analysis: Calcd for $C_{44}H_{90}N_2$: C, 81.6; H, 14.0; N, 4.3. Found: C, 81.4; H, 14.2; N, 4.7.

EXAMPLE 2

N,N,N',N'-Tetracyclohexylmethyl-2-butene-1,4-diamine

A solution of dicyclohexylmethylamine (13.3 g, 63.6 mmol) and 2-butene-1,4-diol diacetate (5.45 g, 31.8 mmol) in THF (100 ml) is treated with tetrakis(triphenylphosphine)palladium (0) (1.0 g, 0.9 mmol) and stirred at room temperature overnight. The reaction mixture is concentrated in vacuo to a solid that is redissolved in THF (500 ml) and treated with 20% aqueous sodium hydroxide (250 ml). The mixture is stirred for one hour, concentrated, and extracted with ether. The ether extracts are dried and concentrated giving an orange solid which is purified by crystallization from isopropyl alcohol. The title compound is isolated as a white solid in a yield of 10.7 g (71%): mp 72°-73° C.

Analysis: Calcd for $C_{32}H_{58}N_2$: C, 81.6; H, 12.4; N, 6.0. Found: C, 81.8; H, 12.7; N, 5.8.

EXAMPLE 3

N,N,N',N'-Tetracyclohexyl-2-butene-1,4-diamine

A solution of dicyclohexylamine (20.4 g, 0.11 mol) and 2-butene-1,4-diol diacetate (9.6 g, 0.056 mol) in THF (100 ml) is treated with tetrakis(triphenylphosphine)palladium (0) (1.0 g, 0.9 mmol) and stirred at room temperature overnight. The reaction mixture is concentrated in vacuo to a solid that is redissolved in THF (500 ml) and treated with 20% aqueous sodium hydroxide (250 ml). The mixture is stirred for one hour, concentrated, and extracted with ether. The ether extracts are dried and concentrated giving an orange solid which is purified by crystallization from isopropyl alcohol. The title compound is isolated as a while solid in a yield of 4.8 g (21%): mp 136°-138° C.

Analysis: Calcd for $C_{28}H_{50}N_2$: C, 81.1; H, 12.2; N, 6.8. Found C, 80.8; H, 12.7; N, 6.7

EXAMPLE 4

N,N,N',N'-Tetrabenzyl-2-butene-1,4-diamine

A solution of dibenzylamine (13.0 g, 66 mmol) and 2-butene-1,4-diol diacetate (4.0 g, 33 mmol) in 50 ml of tetrahydrofuran (THF) is treated with tetrakis(triphenylphosphine)-palladium (0) (1.0 g, 0.9 mmol) and stirred at room temperature overnight. The reaction mixture is concentrated in vacuo to a solid that is redissolved in THF (100 ml) and treated with 20% aqueous sodium hydroxide (25 ml). The mixture is stirred for one hour, then concentrated and extracted with diethyl ether. The ether extracts are dried and concentrated to give 6.9 g (47% yield) of the title compound as a white solid melting at 114°-115° C.

Analysis: Calcd for $C_{32}H_{34}N_2$: C, 86.1; H, 7.7; N, 6.3. Found C, 86.1; H, 7.7; N, 6.2

EXAMPLE 5

N, N, N',N'-Tetraphenyl-2-butene-1,4-diamine

A vigorously stirred mixture of diphenylamine (150 g, 0.9 mol), 1,4-dibromobut-2-ene (104 g, 0.49 mol), potassium iodide (8 g, 0.05 mol), tetrabutylammonium bromide (7 g, 0.025 mol), sodium hydroxide (43 g, 1.06 mol) and 150 ml of water is warmed to 60° C. for five hours. The mixture is allowed to cool to room temperature. The solids formed are collected and washed with water. The residue is recrystallized from ethanol to give 69 grams (36% yield) of the title compound as a tan solid melting at 105°-107° C.

Analysis: Calcd for $C_{28}H_{26}N_2$: C, 86.1; H. 6.7; N, 7.2. Found: C, 85.8; H, 6.5; N, 7.2.

EXAMPLE 6

N,N'-Diphenyl-N,N'-di-1-naphthyl-2-butene-1,4-diamine

A mixture of N-phenyl-1-naphthylamine (63 g, 0.29 mol) and 1.4-dibromobut-2-ene (12 g, 0.056 mol) is heated to 70° C. for three days. The resulting reaction mass is allowed to cool and is then extracted with 3×100 ml of hot hexane. The combined hexane extracts are concentrated in vacuo to an oil which is chromatographed (silica gel. 95/5 cyclohexane/diethyl ether) to give an oil. Said oil is then crystallized from ether to give 4.8 g (17.5% yield) of the title compound as a tan solid melting at 140°-142° C.

EXAMPLE 7

N,N'-Dibenzyl-N,N'-di-α-methylbenzyl-2-butene-1,4-diamine

The procedure of Example 4 is repeated with N-benzyl-α-methylbenzylamine prepared by the method of M. Brook et al., Synth. Comm. 18, 893 (1988). The title compound is obtained in a 20% yield after recrystallization from isopropanol as a white solid melting at 131°-134° C.

Analysis: Calcd for $C_{34}H_{38}N_2$: C, 86.0; H, 8.1; N, 5.9. Found: B, 85.1; H, 8.2; N, 5.7.

EXAMPLE 8

N,N'-Dicyclohexylmethyl-N,N'-dibenzyl-2-butene-1,4-diamine

The general procedure of Example 4 is repeated with N-cyclohexylmethyl-N-benzylamine prepared by the method of S.C. Shim et al., Tetrahedron Letters 31, 105 (1990). After crystallization from isopropanol, the title compound is obtain in an 82% yield as a white solid melting at 92°-93° C.

Analysis Calcd for $C_{32}H_{46}N_2$: C, 83.8; H, 10.1; N, 6.1. Found: C, 83.9; H, 10.3; N, 6.1.

EXAMPLE 9

N,N'-Dibenzyl-N,N'-di-2-cyanoethyl-2-butene-1,4-diamine

Following the general procedure of Example 4 using 3-(benzylamino)propionitrile and after purification of the crude product by chromatography, the title compound is obtained as a clear oil in a yield of 651 %.

Analysis: Calcd for $C_{24}H_{28}N_4$: C, 77.4; H, 7.6; N, 15.1. Found: C, 76.9; H, 7.5; N, 15.1.

EXAMPLE 10

N,N'-Di-1-naphthylmethyl-N,N'-dibenzyl-2-butene-1,4-diamine

The general procedure of Example 4 is repeated with N-1-naphthylmethyl-N-benzylamine prepared by the method of Dahn et al., Helv. Chim. Acta. 37, 565 (1954). After crystallization from 30% ethyl acetate in isopropanol, the title compound is obtained in a yield of 35% as a white solid melting at 121°-122° C.

Analysis: Calcd for $C_{40}H_{38}N_2$: C, 87.9; H, 7.0; N, 5.1. Found: C, 87.5; H, 7.0; N, 5.0.

EXAMPLE 11

N,N-Dicyclohexylmethyl-N',N'-dibenzyl-2-butene-1,4-diamine

A solution of dibenzylamine (40 g, 0.2 mol) and 2-butene-1,4-diol diacetate (105 g, 0.61 mol) dissolved in 150 ml of tetrahydrofuran (THF) is treated with tetrakis(triphenylphosphine)palladium (0) (1.0 g, 0.9 mmol) and stirred at room temperature overnight. The reaction mixture is concentrated in vacuo and the excess 2-butene-1,4-diol diacetate is removed by bulb-to-bulb distillation at 80°-90° C./1 mm. The residue is purified by eluting through a short plug of silica gel (1:1 ethyl acetate: hexanes). 1-Acetoxy-4-dibenzylamino-2-butene is obtained in a yield of 59.2 g (95%).

A solution of 1-acetoxy-4-dibenzylamino-2-butene (10.1 g, 33 mmol) and dicyclohexylmethylamine (6.8 g, 32 mmol) in 50 ml of THF is treated with tetrakis(triphenylphosphine)palladium (0) (1.0 g, 0.9 mmol) and stirred at room temperature overnight. The reaction mixture is concentrated in vacuo to a solid which is redissolved in 100 ml of THF and treated with 25 ml of 20% aqueous sodium hydroxide. The mixture is stirred for one hour, concentrated and extracted with diethyl ether. The ether extracts are dried and concentrated to give a solid which is then purified by crystallization from isopropanol. The title compound is obtained in a yield of 9.7 g (65%) as a white solid melting at 61°-62° C.

Analysis: Calcd for $C_{32}H_{46}N_2$: C, 83.8; H, 10.1; N, 6.1. Found: C, 83.8; H, 10.2; N, 5.9.

EXAMPLE 12

N,N,N',N'-Tetra-p-methoxycarbonylbenzyl-2-butene-1,4-diamine

Di(p-carboxybenzyl)amine (17.2 g, 0.06 mol), prepared according to the method given in U.S. Pat. No. 3,335,176, is suspended in 300 ml of methanol. The suspension is then saturated with hydrogen chloride gas without cooling. The resulting mixture is then refluxed for five hours, cooled and finally concentrated to a solid. The solid is suspended in water, the aqueous suspension is then made basic using ammonium hydroxide and finally extracted with ethyl acetate. The organic extracts are dried over anhydrous magnesium sulfate and concentrated to give di-(p-methoxycarbonylbenzyl)amine as an oil.

Di(pmethoxycarbonylbenzyl)amine (14.1 g, 0.045 mol) and 2-butene-1,4-diol diacetate (3.9 g, 0.023 mol) are dissolved in 150 ml of THF. Tetrakis(triphenylphosphine)palladium (0) (1.0 g, 0.9 mmol) is added and the resulting solution is stirred for three days at room temperature. The solution is concentrated, the residue redissolved in THF and treated with 20 ml of ammonium hydroxide solution, stirred for 15 minutes and finally concentrated to a solid which is washed with water, diethyl ether and dried. The title compound is obtained in a 72% yield as a white solid melting at 161°–163° C.

EXAMPLE 13

N,N,N',N'-Tetra-p-methoxybenzyl-2-butene-1,4-diamine

Following the general procedure of Example 4 by replacing dibenzylamine with an equivalent amount of di-(p-methoxybenzyl)amine, prepared by the method of Tanaka et al., Chem. Pharm. Bull, 15, 774 (1067), the title compound is afforded in a 33% yield as a white solid melting at 128°–130° C.

EXAMPLE 14

N,N-Diphenyl-N',N'-dibenzyl-2-butene-1,4-diamine

Following the general procedure of Example 11 by replacing 1-acetoxy-4-dibenzylamino-2-butene with 1-acetoxy-4-diphenylamino-2-butene and replacing dicyclohexylmethylamine with dibenzylamine, the title compound is obtained as a white solid.

EXAMPLE 15

Process Stabilization of Dynamically Crosslinked Polypropylene/Nitrile Rubber

A Brabender cavity heated to 190° C. is charged with 55 g of a dynamically crosslinked polypropylene/nitrile rubber resin. The resin is stirred under nitrogen for three minutes, 2% or 4% by weight of the stabilizer test sample is added and mixed under nitrogen for an additional seven minutes. The sample is removed, flattened in a cold press, and is subjected to the following procedure:

Compression Molding

Plaques [60 mil and 4"×4" (1.524 mm and 10.16 cm)] are prepared by loading 18–20 g of said rubber per plaque. The temperature of the compression molding press platens is adjusted to 200°C. The resin is preheated to allow it to flow. The resin is compression molded at low pressure [2000 psi (140 Kg/cm$^2$)] for four minutes and at high pressure [50,000 psi (3500 Kg/cm$^2$)] for four minutes.

Sample Preparation and Oven Aging

The samples are cut on a Naef press using Die C whose dimensions are described in ASTM D412. The cut samples are mounted in replicates and oven aged at 135° C. for seven days before tensile testing for % retention of elongation according to ASTM D412. A greater % retention of elongation indicates a more effective stabilizer.

| Test Sample* of Example | Conc. % by wt | % Retention of Elongation After 7 Days at 135° C. |
|---|---|---|
| Blank | — | 45 |
| AO1 | 2 | 69 |
| AO1 | 4 | 71 |
| AO2 | 2 | 77 |
| AO2 | 4 | 82 |
| Example 1 plus AO2 (75:25) | 2 | 81 |
| Example 1 plus AO2 (50:50) | 2 | 81 |
| Example 1 plus AO2 (25:75) | 2 | 89 |
| Example 1 plus AO2 (75:25) | 4 | 95 |
| Example 1 plus AO2 (50:50) | 4 | 100 |
| Example 1 plus AO2 (25:75) | 4 | 89 |
| Example 4 | 2 | 40 |
| Example 4 plus AO2 (75:25) | 2 | 76 |
| Example 4 plus AO2 (50:50) | 2 | 83 |
| Example 4 plus AO2 (25:75) | 2 | 86 |
| Example 4 | 4 | 82 |
| Example 4 plus AO2 (75:25) | 4 | 95 |
| Example 4 plus AO2 (50:50) | 4 | 92 |
| Example 4 plus AO2 (25:75) | 4 | 92 |
| Example 5 | 2 | 66 |
| Example 5 plus AO2 (75:25) | 2 | 80 |
| Example 5 plus AO2 (50:50) | 2 | 81 |
| Example 5 plus AO2 (25:75) | 2 | 75 |
| Example 5 | 4 | 72 |
| Example 5 plus AO2 (75:25) | 4 | 98 |
| Example 5 plus AO2 (50:50) | 4 | 85 |
| Example 5 plus AO2 (25:75) | 4 | 115 |

*AO1 is the 50:50 blend of an acetone/diphenylamine condensate with 2-mercaptotolylimidazole.
AO2 is 2-mercaptotolylimidazole.

These data show that a combination of an instant compound of formula I, II or III with a mercaptoimidazole provides at the same total stabilizer concentration equal to significantly superior stabilization protection to an elastomer compared to either component alone.

EXAMPLE 16

Process Stabilization of Dynamically Crosslinked Polypropylene/Nitrile Rubber

Following the general procedure of Example 15, other test samples are oven aged at 135° C. for seven days. The aged samples are tested for % retention of elongation according to ASTM D412. A greater % retention of elongation indicates a more effective stabilizer. The results are seen in the table below.

| Test Sample* of Example | Conc. % by wt | % Retention of Elongation After 7 Days at 135° C. |
|---|---|---|
| Blank | — | 1 |
| AO1 | 4 | 70 |
| AO2 | 4 | 72 |
| Example 1 | 4 | 60 |
| Example 1 plus AO2 (50:50) | 4 | 102 |
| Example 2 | 4 | 67 |
| Example 2 plus AO2 (50:50) | 4 | 109 |
| Example 8 | 4 | 72 |
| Example 8 plus AO2 (50:50) | 4 | 95 |
| Example 11 | 4 | 69 |

-continued

| Test Sample* of Example | Conc. % by wt | % Retention of Elongation After 7 Days at 135° C. |
|---|---|---|
| Example 11 plus AO2 (50:50) | 4 | 84 |
| Example 12 | 4 | 53 |
| Example 12 plus AO2 (50:50) | 4 | 83 |

*AO1 is the 50:50 blend of an acetone/diphenylamine condensate with 2-mercaptotolylimidazole.
AO2 is 2-mercaptotolylimidazole.

These data show that a combination of an instant compound of formula I or II with a mercaptoimidazole provides at the same total stabilizer concentration equal to significantly superior stabilizer protection to an elastomer compared to either component along.

EXAMPLE 17

Process Stabilization of Dynamically Crosslinked Polypropylene/Nitrile Rubber

Following the general procedure of Example 15, the test samples are oven aged at 135° C. for eleven days. The aged samples are tested for % retention of elongation according to ASTM D412. A greater % retention of elongation indicates a more effective stabilizer. The results are seen in the table below.

| Test Sample* of Example | Conc. % by wt | % Retention of Elongation After 11 Days at 135° C. |
|---|---|---|
| Blank | — | 2 |
| AO1 | 4 | 39 |
| AO2 | 4 | 40 |
| Example 4 plus AO2 (50:50) | 4 | 55 |
| Example 5 plus AO2 (50:50) | 4 | 57 |

*AO1 is the 50:50 blend of an acetone/diphenylamine condensate with 2-mercaptotolylimidazole.
AO2 is 2-mercaptotolylimidazole.

These data show that a combination of an instant compound of formula II or III with a mercaptoimidazole provides at the same total stabilizer concentration equal to significantly superior stabilization protection to an elastomer compared to either component alone.

What is claimed is:

1. An elastomer composition stabilized against the deleterious effects of heat or oxygen which comprises
   (a) an elastomer, and
   (b) an effective stabilizing amount of a blend of
      (i) an amine of formula I, II or III

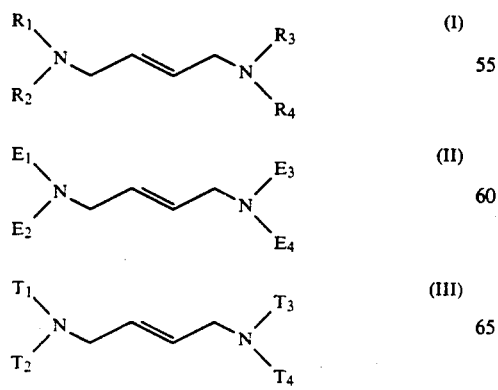

wherein
$R_1$, $R_2$, $R_3$ and $R_4$ are independently a linear or branched alkyl of 8 to 30 carbon atoms; alkyl of 1 to 20 carbon atoms substituted with cycloalkyl of 5 to 12 carbon atoms; or alkyl of 1 to 20 carbon atoms terminated with —$OR_5$, —$NR_6R_7$, —$SR_8$, —$COOR_9$ or —$CONR_{10}R_{11}$, where $R_5$, $R_6R_7$, $R_8$ and $R_9$ are independently alkyl of 1 to 20 carbon atoms or alkenyl of 3 to 18 carbon atoms, and $R_{10}$ and $R_{11}$ are independently hydrogen or the same meaning as $R_5$; or alkyl of 3 to 18 carbon atoms interrupted by one or more —O—, —S—, —SO—, —$SO_2$—, —CO—, —COO—, —OCO—, —$CONR_{12}$—, —$NR_{12}CO$— or —$NR_{13}$— where $R_{12}$ and $R_{13}$ have the same meaning as $R_{10}$; or $R_1$, $R_2$, $R_3$ and $R_4$ are independently cycloalkyl of 5 to 12 carbon atoms; or alkenyl of 3 to 20 carbon atoms;

$E_1$ is aralkyl of 7 to 15 carbon atoms or said aralkyl substituted on the aryl ring by one to three groups selected from alkyl of 1 to 12 carbon atoms, —CN, —$NO_2$, halogen, —$OR_5$, —$NR_6R_7$, —$SR_8$, —$COOR_9$ or —$CONR_{10}R_{11}$, where $R_5$, $R_6$, $R_7$, $R_8$, $R_9$, $R_{10}$ and $R_{11}$ are as defined above, $E_2$, $E_3$ and $E_4$ are independently a linear or branched alkyl of 1 to 30 carbon atoms; alkyl of 1 to 20 carbon atoms substituted with cycloalkyl of 5 to 12 carbon atoms; or alkyl of 1 to 20 carbon atoms terminated with —CN, —$OR_5$, —$NR_6R_7$, —$SR_8$, —$COOR_9$ or —$CONR_{10}R_{11}$, where $R_5$, $R_6R_7$, $R_8$ and $R_9$ are independently alkyl of 1 to 20 carbon atoms or alkenyl of 3 to 18 carbon atoms, and $R_{10}$ and $R_{11}$ are independently hydrogen or the same meaning as $R_5$; or alkyl of 3 to 18 carbon atoms interrupted by one or more —O—, —S—, —SO—, —$SO_2$—, —CO—, —COO—, —OCO—, —$CONR_{12}$—, —$NR_{12}CO$— or —$NR_{13}$— where $R_{12}$ and $R_{13}$ have the same meaning as $R_{10}$; or $E_2$, $E_3$ and $E_4$ are independently cycloalkyl of 5 to 12 carbon atoms, alkenyl of 3 to 20 carbon atoms, aralkyl of 7 to 15 carbon atoms or said aralkyl substituted on the aryl ring by one to three groups selected from alkyl of 1 to 12 carbon atoms, —CN, —$NO_2$, halogen, —$OR_5$, —$NR_6R_7$, —$SR_8$, —$COOR_9$ or —$CONR_{10}R_{11}$, where $R_5$, $R_6$, $R_7$, $R_8$, $R_9$, $R_{10}$ and $R_{11}$ are as defined above, or aryl of 6 to 10 carbon atoms or said aryl substituted by one to three substituents selected from the group consisting of alkyl of 1 to 20 carbon atoms, cycloalkyl of 5 to 12 carbon atoms and aralkyl of 7 to 15 carbon atoms, and $T_1$, $T_2$, $T_3$ and $T_4$ are independently aryl of 6 to 10 carbon atoms or said aryl substituted by one to three substituents selected from the group consisting of alkyl of 1 to 20 carbon atoms, cycloalkyl of 5 to 12 carbon atoms and aralkyl of 7 to 15 carbon atoms, and (ii) a mercaptoimidizazole of formula IV

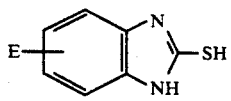
(IV)

where
E is hydrogen, alkyl of 1 to 18 carbon atoms, said alkyl substituted by —COOG where G is alkyl of 1 to 18 carbon atoms, cycloalkyl of 5 to 12 carbon atoms, aryl of 6 to 10 carbon atoms, or phenylalkyl of 7 to 9 carbon atoms;
where the weight ratio of component (i) to component (ii) in the blend is from 90:10 to 10:90.

2. A composition according to claim 1, wherein the elastomer of component (a) is crosslinked polypropylene/nitrile rubber.

3. A composition according to claim 1 wherein the compound of compound (b)(i) is of formula I where $R_1$, $R_2$, $R_3$ and $R_4$ are independently cycloalkyl of 5 or 6 carbon atoms, a linear or branched alkyl of 8 to 20 carbon atoms or alkyl of 1 to 4 carbon atoms substituted with cycloalkyl of 5 or 6 carbon atoms.

4. A composition according to claim 2 wherein $R_1$, $R_2$, $R_3$ and $R_4$ are the same and are alkyl of 8 to 18 carbon atoms, cyclohexyl or cyclohexylmethyl.

5. A composition according to claim 1 wherein the compound of component (b)(i) is of formula II where $E_1$ is benzyl substituted on the phenyl ring by alkyl of 1 to 8 carbon atoms; α-methylbenzyl or 1-naphthylmethyl, and $E_2$, $E_3$ and $E_4$ are independently alkyl of 1 to 20 carbon atoms, benzyl, benzyl substituted on the phenyl ring by alkyl of 1 to 8 carbon atoms or by methoxycarbonyl; α-methylbenzyl; phenyl, 1-naphthyl or said phenyl or said 1-naphthyl substituted by alkyl of 1 to 8 carbon atoms; cyclohexylmethyl or 2-cyanoethyl.

6. A composition according to claim 5 wherein $E_3$ has the same meaning as $E_1$ and is benzyl or 1-naphthylmethyl; and $E_2$ and $E_4$ are alkyl of 1 to 20 carbon atoms, benzyl or 1-naphthylmethyl.

7. A composition according to claim 1 wherein the compound of component (b)(i) is of formula III where $T_1$, $T_2$, $T_3$ and $T_4$ are independently phenyl, 1-naphthyl or said phenyl or said 1-naphthyl substituted by alkyl of 1 to 8 carbon atoms.

8. A composition according to claim 7 wherein $T_1$ and $T_3$ are phenyl, and $T_2$ and $T_4$ are phenyl or 1-naphthyl.

9. A composition according to claim 8 wherein $T_1$, $T_2$, $T_3$ and $T_4$ are each phenyl.

10. A composition according to claim 1 wherein the compound of component (b)(ii) is of formula IV where E is hydrogen, alkyl of 1 to 4 carbon atoms, benzyl or alkyl substituted by —COOG where G is alkyl of 1 to 4 carbon atoms.

11. A composition according to claim 10 wherein E is methyl.

12. A composition according to claim 1 wherein the compound of component (b)(i) is
N,N,N',N'-tetradecyl-2-butene-1,4-diamine;
N,N,N',N'-tetracyclohexylmethyl-2-butene-1,4-diamine;
N,N,N',N'-tetracyclohexyl-2-butene-1,4-diamine;
N,N,N',N'-tetrabenzyl-2-butene-1,4-diamine;
N,N,N',N'-tetraphenyl-2-butene-1,4-diamine;
N,N'-diphenyl-N,N'-di-1-naphthyl-2-butene-1,4-diamine;
N,N'-dibenzyl-N,N'-di-α-methylbenzyl-2-butene-1,4-diamine;
N,N'-dicyclohexylmethyl-N,N'-dibenzyl-2-butene-1,4-diamine;
N,N'-dibenzyl-N,N'-di-2-cyanoethyl-2-butene-1,4-diamine;
N,N'-di-1-naphthyl-N,N'-dibenzyl-2-butene-1,4-diamine;
N,N'-dicyclohexylmethyl-N',N'-dibenzyl-2-butene-1,4-diamine;
N,N,N',N'-tetra-p-methoxycarbonylbenzyl-2-butene-1,4-diamine;
N,N,N',N'-tetra-p-methoxybenzyl-2-butene-1,4-diamine; or
N,N-diphenyl-N',N'-dibenzyl-2-butene-1,4-diamine.

13. A composition according to claim 12 wherein the compound of component (b)(i) is
N,N,N',N'-tetradecyl-2-butene-1,4-diamine;
N,N,N',N'-tetracyclohexylmethyl-2-butene,1,4-diamine;
N,N'-dicyclohexylmethyl-N,N'-dibenzyl-2-butene-1,4-diamine;
N,N-dicyclohexylmethyl-N', N'-dibenzyl-2-butene-1,4-diamine;
N,N,N',N'-tetra-p-methoxycarbonylbenzyl-2-butene-1,4-diamine;
N,N,N',N'-tetra-p-methoxybenzyl-2-butene-1,4-diamine;
N,N,N',N'-tetrabenzyl-2-butene-1,4-diamine; or
N,N,N',N'-tetraphenyl-2-butene-1,4-diamine.

* * * * *